(12) United States Patent
Katsuya (10) Patent No.: US 12,176,724 B2
(45) Date of Patent: Dec. 24, 2024

(54) POWER CONTROL DEVICE (71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 16 days.

(21) Appl. No.: 18/109,880

(22) Filed: Feb. 15, 2023

(65) Prior Publication Data

US 2023/0307955 A1 Sep. 28, 2023

(30) Foreign Application Priority Data

Mar. 22, 2022 (JP) ................................. 2022-045987

(51) Int. Cl.
| | | |
|---|---|---|
| *H02J 50/12* | (2016.01) | |
| *H02M 1/42* | (2007.01) | |
| *H02M 3/335* | (2006.01) | |

(52) U.S. Cl.
CPC ........... *H02J 50/12* (2016.02); *H02M 1/4233* (2013.01); *H02M 3/33584* (2013.01)

(58) Field of Classification Search
None
See application file for complete search history.

(56) References Cited

U.S. PATENT DOCUMENTS

| | | |
|---|---|---|
| 2011/0231029 A1 | 9/2011 | Ichikawa et al. |
| 2021/0281192 A1* | 9/2021 | Suzuki ................... H02M 1/007 |
| 2022/0340024 A1* | 10/2022 | Chen ....................... H02J 50/12 |

FOREIGN PATENT DOCUMENTS

| | | |
|---|---|---|
| JP | 2017-093094 | 5/2017 |
| JP | 2021-016232 | 2/2021 |
| JP | 2021-141713 | 9/2021 |
| WO | 2010/035321 | 4/2010 |
| WO | 2019/150597 | 8/2019 |

OTHER PUBLICATIONS

Japanese Office Action for Japanese Patent Application No. 2022-045987 mailed Feb. 6, 2024.

* cited by examiner

*Primary Examiner* — Daniel Kessie
(74) *Attorney, Agent, or Firm* — Amin, Turocy & Watson, LLP (57) ABSTRACT

A power control device includes a power receiving device, a second power converting device, and a control device. The power receiving device receives electric power transmitted from a power transmitting device in a non-contact manner and outputs DC electric power. The second power converting device includes an element module including transistors forming a pair in two phases and a pair of reactors that are magnetically coupled. The second power converting device outputs arbitrary DC electric power by converting the DC electric power output from the power receiving device. The control device controls a switching operation of the element module according to a duty ratio based on a second voltage at an optimal operating point of the DC electric power input from the power receiving device to the second power converting device and a first voltage of the DC electric power output from the second power converting device.

2 Claims, 4 Drawing Sheets

POWER CONTROL DEVICE

CROSS-REFERENCE TO RELATED APPLICATION

Priority is claimed on Japanese Patent Application No. 2022-045987, filed Mar. 22, 2022, the content of which is incorporated herein by reference.

BACKGROUND OF THE INVENTION

Field of the Invention

The present invention relates to a power control device.

Description of Related Art

In the related art, interest in electric vehicles for the purpose of reducing adverse effects on the global environment has increased, and systems for supplying electric power from the outside in a non-contact manner at the time of traveling of an electric vehicle or the like have been studied.

In the related art, a power receiving device that includes an AC-DC converter for converting AC electric power to DC electric power and a DC-DC converter for converting a voltage of DC electric power rectified by the AC-DC converter and that controls the converters such that power transmission efficiency is maximized by optimizing a load resistance value is known (for example, see Japanese Unexamined Patent Application, First Publication No. 2017-93094).

SUMMARY OF THE INVENTION

The DC-DC converter of the power receiving device is a step-up converter, a step-down converter, or a bidirectional converter for step-up and step-down. However, there is demand for a further increase in power conversion efficiency in order to improve the power transmission efficiency.

Aspects of the present invention were invented in consideration of the aforementioned circumstances and an objective thereof is to provide a power control device that can increase power transmission efficiency.

The present invention employs the following aspects to achieve the aforementioned objective.

(1) A power control device according to an aspect of the present invention includes: a power receiving device configured to receive electric power transmitted from a power transmitting device in a non-contact manner and output DC electric power; a power converting device configured to output arbitrary DC electric power by converting the DC electric power output from the power receiving device; and a control device configured to control the power receiving device and the power converting device. The power converting device includes an element module including at least two switching elements and at least a pair of reactors that are magnetically coupled. The control device controls a switching operation of the element module according to a duty ratio based on a voltage at an optimal operating point of the DC electric power input from the power receiving device to the power converting device and a voltage of the DC electric power output from the power converting device.

(2) In the aspect of (1), the control device may set the voltage at an optimal operating point on the basis of an output voltage of the power transmitting device and a state quantity of magnetic coupling of the power transmitting device and the power receiving device.

(3) In the aspect of (1) or (2), the control device may use a voltage of the DC electric power input to the power converting device in a steady state which is obtained by modeling the element module and the reactors as the voltage at an optimal operating point.

According to the aspect of (1), it is possible to efficiently perform power conversion using the pair of reactors that are magnetically coupled and the element module while maintaining the optimal operating point and to enhance power transmission efficiency in a non-contact manner. Since a load resistance value when seen from the power transmitting device and the power receiving device seems to be constant, for example, regardless of output change while a vehicle is traveling or the like, it is possible to curb occurrence of a problem such as a decrease in efficiency or a decrease in output.

According to the aspect of (2), it is possible to control the load resistance value when seen from the power transmitting device and the power receiving device on the basis of the voltage of the DC electric power input to the power converting device and to maximize power transmission efficiency by optimizing the load resistance value based on the voltage at an optimal operating point.

According to the aspect of (3), it is possible to enhance power transmission efficiency in a non-contact manner with high-efficiency power conversion by modeling the pair of reactors that are magnetically coupled and the element module.

DETAILED DESCRIPTION OF THE INVENTION

Hereinafter, a power control device according to an embodiment of the present invention will be described with reference to the accompanying drawings.

Figure 1:
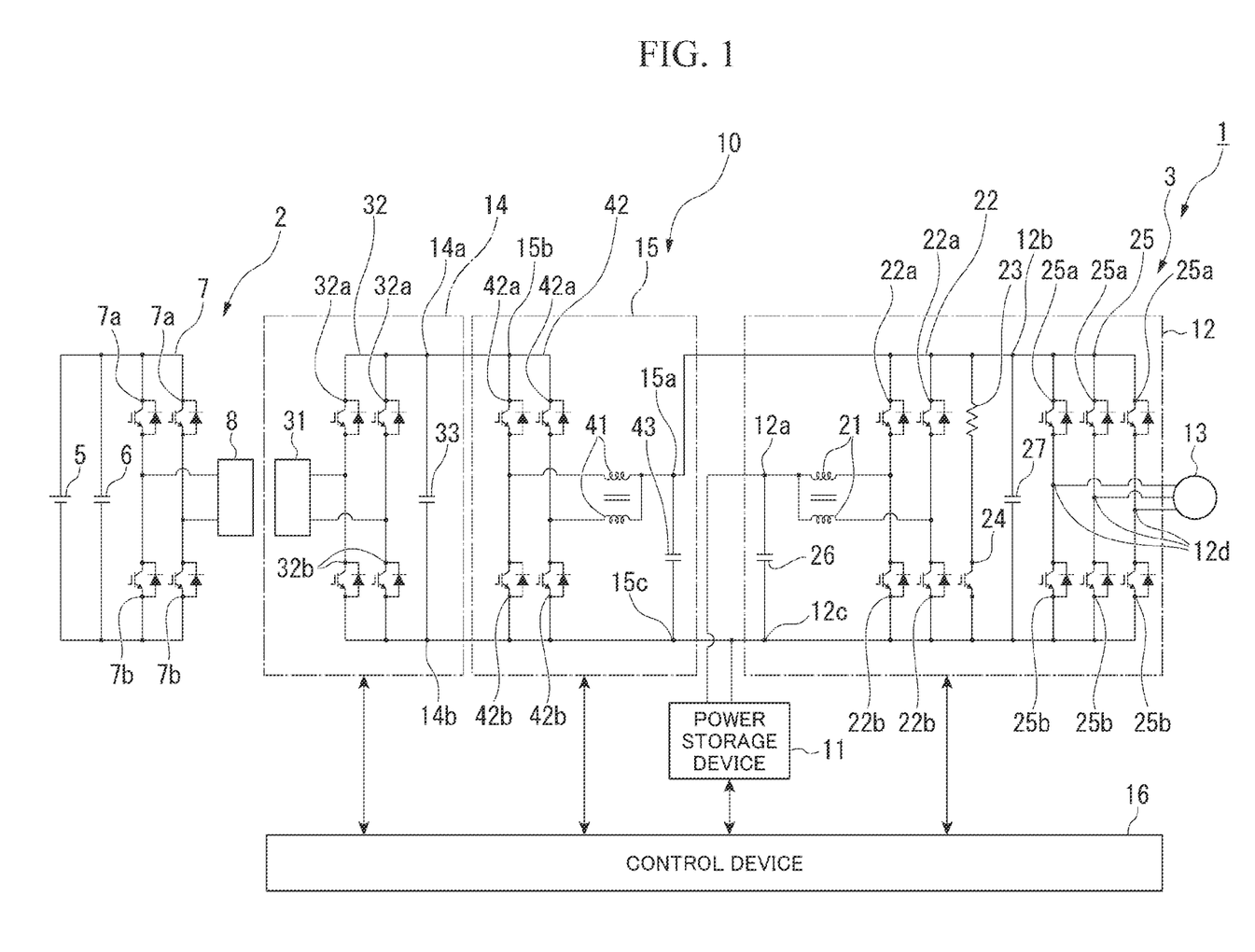
FIG. 1 is a diagram illustrating a configuration of a non-contact power transmission system including a power control device according to an embodiment of the present invention.
Figure 2:
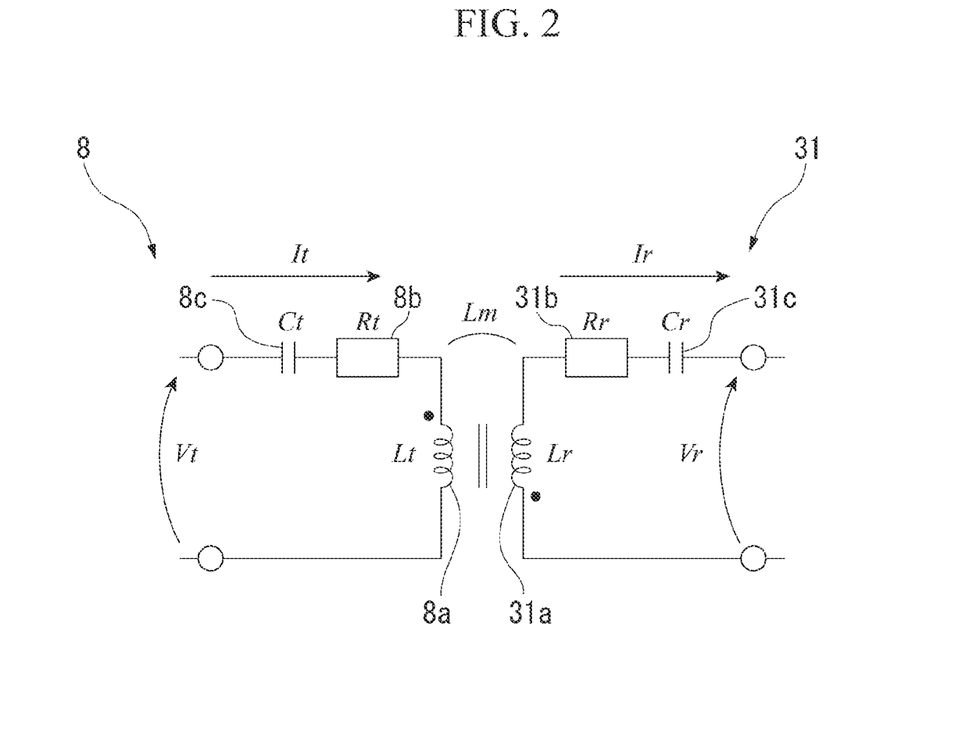
FIG. 2 is a diagram illustrating configurations of a power transmitting unit and a power receiving unit of the non-contact power transmission system according to the embodiment of the present invention.

FIG. 1 is a diagram illustrating a configuration of a non-contact power transmission system 1 including a power control device 10 according to an embodiment of the present invention. FIG. 2 is a diagram illustrating configurations of a power transmitting unit 8 and a power receiving unit 31 of the non-contact power transmission system 1 according to the embodiment of the present invention.

The power control device 10 according to the embodiment is mounted in a vehicle. The non-contact power transmission system 1 including the power control device 10 supplies electric power from the outside of the vehicle to the vehicle in a non-contact manner.

(Non-Contact Power Transmission System)

As illustrated in FIG. 1, the non-contact power transmission system 1 according to the embodiment includes, for example, a power transmitting device 2 that is installed on a traveling path of the vehicle or the like and a drive control device 3 and a power control device 10 that are mounted in the vehicle.

The power transmitting device 2 includes, for example, a power supply unit 5, a capacitor 6, a power converting unit 7, and a power transmitting unit 8.

The power supply unit 5 includes, for example, an AC power supply such as a commercial power supply and an AC-DC converter that converts AC electric power to DC electric power. The power supply unit 5 converts AC electric power supplied from the AC power supply to DC electric power using the AC-DC converter.

The capacitor 6 is connected in parallel to the power supply unit 5. The capacitor 6 smooths DC electric power output from the power supply unit 5.

The power converting unit 7 includes, for example, an inverter that converts DC electric power to AC electric power. The power converting unit 7 includes a bridge circuit including a plurality of switching elements that are bridge-connected in two phases and a rectification element. Each of the switching elements is, for example, a transistor such as a metal oxide semiconductor field-effect transistor (MOSFET) of silicon carbide (SiC). The plurality of switching elements include transistors 7a and 7b in a high-side arm and a low-side arm forming a pair in each phase. A collector of the transistor 7a in the high-side arm is connected to a positive electrode of the power supply unit 5. An emitter of the transistor 7b in the low-side arm is connected to a negative electrode of the power supply unit 5. An emitter of the transistor 7a in the high-side arm and a collector of the transistor 7b in the low-side arm are connected to the power transmitting unit 8. Each rectification element is a backflow diode that is forward connected in parallel from the emitter to the collector between the collector and the emitter of each of the transistors 7a and 7b.

The power transmitting unit 8 transmits electric power through change in a high-frequency magnetic field, for example, by magnetic-field coupling such as magnetic resonance or electromagnetic induction. As illustrated in FIG. 2, the power transmitting unit 8 includes, for example, a resonance circuit which is formed by a primary coil 8a, a primary resistor 8b, and a primary capacitor 8c which are connected in series.

As illustrated in FIG. 1, the drive control device 3 of the vehicle includes, for example, a power storage device 11, a first power converting device 12, and a rotary electric machine 13.

The power control device 10 of the vehicle includes, for example, a power receiving device 14, a second power converting device 15, and a control device 16.

The power storage device 11 is charged with electric power that is transmitted from the power transmitting device 2 outside of the vehicle 1 in a non-contact manner. The power storage device 11 receives and transmits electric power from and to the rotary electric machine 13 via the first power converting device 12.

The power storage device 11 includes, for example, a battery such as a lithium ion battery and a voltage controller for performing bidirectional voltage conversion for step-up and step-down. The power storage device 11 converts input electric power and output electric power using a voltage controller at the time of charging and discharging of the battery. The power storage device 11 is connected to a positive terminal 12a on the primary side and a negative terminal 12c of the first power converting device 12 which will be described later.

The first power converting device 12 includes, for example, a voltage converter for performing bidirectional voltage conversion for step-up and step-down and a power converter for performing conversion between DC electric power and AC electric power. The first power converting device 12 includes, for example, a pair of reactors 21, a first element module 22, a resistor 23, a switching element 24, a second element module 25, a first capacitor 26, and a second capacitor 27.

The pair of reactors 21 are magnetically coupled in opposite polarities to form a compound reactor. The pair of reactors 21 are connected to the positive terminal 12a and the first element module 22 on the primary side.

The first element module 22 includes, for example, a bridge circuit including a plurality of switching elements that are bridge-connected in two phases and a rectification element. Each of the switching elements is, for example, a transistor such as a MOSFET of silicon carbide (SiC). The plurality of switching elements include transistors 22a and 22b in a high-side arm and a low-side arm forming a pair in each phase. A collector of the transistor 22a in the high-side arm is connected to the positive terminal 12b on the secondary side. An emitter of the transistor 22b in the low-side arm is connected to the negative terminal 12c which is common to the primary side and the secondary side. The emitter of the transistor 22a in the high-side arm and the collector of the transistor 22b in the low-side arm are connected to the reactor 21. Each rectification element is a backflow diode that is forward connected in parallel from the emitter to the collector between the collector and the emitter of each of the transistors 22a and 22b.

The pair of reactors 21 and the first element module 22 perform voltage conversion through so-called two-phase interleave. In the two-phase interleave, a first period of switching control of the transistors 22a and 22b in a first phase and a first period of switching control of the transistors 22a and 22b in a second phase out of the transistors 22a and 22b in two phases connected to the pair of reactors 21 are deviated from each other by a half period.

The resistor 23 and the switching element 24 are connected in series. The switching element 24 is, for example, a transistor such as a MOSFET of SiC. The resistor 23 is connected to the positive terminal 12b and the collector of the switching element 24 on the secondary side and the emitter of the switching element 24 is connected to the negative terminal 12c.

The second element module 25 includes, for example, a bridge circuit including a plurality of switching elements that are bridge-connected in three phases and a rectification element. Each of the switching elements is, for example, a transistor such as a MOSFET of silicon carbide (SiC). The plurality of switching elements include transistors 25a and 25b in a high-side arm and a low-side arm forming a pair in each phase. A collector of the transistor 25a in the high-side arm is connected to the positive terminal 12b on the secondary side. An emitter of the transistor 25b in the low-side arm is connected to the negative terminal 12c. The emitter of the transistor 25a in the high-side arm and the collector of the transistor 25b in the low-side arm are connected to the stator winding of the rotary electric machine 13 via an AC terminal 12d. Each rectification element is, for example, a backflow diode that is forward connected in parallel from the emitter to the collector between the collector and the emitter of each of the transistors 25a and 25b.

The first capacitor 26 is connected to the positive terminal 12a and the negative terminal 12c on the primary side. The second capacitor 27 is connected to the positive terminal 12b and the negative terminal 12c on the secondary side between the first element module 22 and the second element module 25. The capacitors 26 and 27 smooth voltage change that occurs with an operation of switching the switching elements between an on state (connected) and an off state (disconnected) of each switching element.

The second element module 25 controls an operation of the rotary electric machine 13 through transmission and reception of electric power. The second element module 25 converts DC electric power input from the positive terminal and the negative terminal to three-phase AC electric power and supplies the three-phase AC electric power to the rotary electric machine 13, for example, when the rotary electric machine 13 is powered. The second element module 25 generates a rotational driving force by causing a current to flow sequentially to three-phase stator windings of the rotary electric machine 13.

The second element module 25 converts three-phase AC electric power input from the three-phase stator windings to DC electric power by driving the on state (connected) and the off state (disconnected) of the switching elements in the phases which are synchronized with rotation of the rotary electric machine 13, for example, when the rotary electric machine 13 is regenerated. The second element module 25 can supply DC electric power to which three-phase AC electric power is converted to the power storage device 11 via the pair of reactors 21 and the first element module 22. The rotary electric machine 13 is, for example, a brushless DC motor of three-phase AC. The rotary electric machine 13 includes a rotor that includes a permanent magnet for a magnetic field and a stator that includes three-phase stator windings for generating a rotary magnetic field for generating the rotor. The three-phase stator windings are connected to AC terminals 12d of three phases of the first power converting device 12.

The rotary electric machine 13 generates a rotational driving force by performing a powering operation using electric power supplied from the first power converting device 12. The rotary electric machine 13 generates a travel driving force by performing a powering operation using electric power supplied from the first power converting device 12, for example, when it can be connected to wheels of the vehicle. The rotary electric machine 13 may generate electric power by performing a regenerative operation using a rotational moving force input from the wheels of the vehicle. The rotary electric machine 13 may generate electric power using power of an internal combustion engine when it can be connected to the internal combustion engine of the vehicle.

The power receiving device 14 includes, for example, a power receiving unit 31, a power converting unit 32, and a capacitor 33.

As illustrated in FIG. 2, the power receiving unit 31 receives electric power based on change of a high-frequency magnetic field transmitted from the power transmitting unit 8 through magnetic-field coupling such as magnetic resonance or electromagnetic induction. The power receiving unit 31 includes, for example, a resonance circuit including a secondary coil 31a, a secondary resistor 31b, and a secondary capacitor 31c which are connected in series.

As illustrated in FIG. 1, the power converting unit 32 includes a so-called full-bridge (or bridgeless and totem-pole) power factor correction (PFC) circuit that converts AC electric power to DC electric power. The so-called bridgeless PFC circuit is an PFC not including a bridge rectifier using a plurality of diodes which are bridge-connected, and the so-called totem-pole PFC circuit is a PFC circuit including a pair of switching elements of the same conductivity type which are connected in series (totem-pole connected) in series in the same direction.

The power converting unit 32 includes, for example, a bridge circuit including a plurality of switching elements and the rectification elements which are bridge-connected in two phases. Each of the switching elements is, for example, a transistor such as a MOSFET of silicon carbide (SiC). The plurality of switching elements include transistors 32a and 32b in a high-side arm and a low-side arm forming a pair in each phase. A collector of the transistor 32a in the high-side arm is connected to the positive terminal 14a on the secondary side. An emitter of the transistor 32b in the low-side arm is connected to the negative terminal 14b on the secondary side. The emitter of the transistor 32a in the high-side arm and the collector of the transistor 32b in the low-side arm are connected to the power receiving unit 31. Each rectification element is, for example, a backflow diode that is forward connected in parallel from the emitter to the collector between the collector and the emitter of each of the transistors 32a and 32b.

The capacitor 33 is connected to the positive terminal 14a and the negative terminal 14b on the secondary side. The capacitor 33 smooths voltage change that occurs with an operation of switching the switching elements between an on state (connected) and an off state (disconnected) of each switching element.

The second power converting device 15 outputs arbitrary DC electric power by converting DC electric power output from the power receiving device 14. The second power converting device 15 includes, for example, a voltage converter for performing voltage conversion for step-down. The second power converting device 15 includes, for example, a pair of reactors 41, an element module 42, and a capacitor 43.

The pair of reactors 41 are magnetically coupled in opposite polarities to form a compound reactor. The pair of reactors 41 are connected to the positive terminal 15a and the element module 42 on the secondary side.

The element module 42 includes, for example, a bridge circuit including a plurality of switching elements and a rectification element that are bridge-connected in two phases. Each of the switching elements is, for example, a transistor such as a MOSFET of SiC. The plurality of switching elements include transistors 42a and 42b in a high-side arm and a low-side arm forming a pair in each phase. A collector of the transistor 42a in the high-side arm is connected to the positive terminal 42b on the primary side. An emitter of the transistor 42b in the low-side arm is connected to the negative terminal 14c which is common to the primary side and the secondary side. The emitter of the transistor 42a in the high-side arm and the collector of the transistor 42b in the low-side arm are connected to the reactor 41. Each rectification element is a backflow diode that is forward connected in parallel from the emitter to the collector between the collector and the emitter of each of the transistors 42a and 42b.

The pair of reactors 41 and the first element module 42 perform voltage conversion through so-called two-phase interleave. In the two-phase interleave, a first period of switching control of the transistors 42a and 42b in a first phase and a first period of switching control of the transistors 42a and 42b in a second phase out of the transistors 42a and 42b in two phases connected to the pair of reactors 41 are deviated from each other by a half period.

The capacitor 43 is connected to the positive terminal 15a and the negative terminal 15c on the secondary side. The capacitor 43 smooths voltage change that occurs with an operation of switching the switching elements between an on state (connected) and an off state (disconnected) of each switching element.

The positive terminal 15b on the primary side of the second power converting device 15 is connected to the positive terminal 14a on the secondary side of the power receiving device 14.

The positive terminal 15a on the secondary side of the second power converting device 15 is connected to the positive terminal 12b on the secondary side of the first power converting device 12.

The negative terminal 15c of the second power converting device 15 is connected to the negative terminal 14b on the secondary side of the power receiving device 14 and the negative terminal 12c of the first power converting device 12.

The control device 16 comprehensively controls, for example, the drive control device 3 of the vehicle and the power control device 10. The control device 16 is, for example, a software functional unit serving by causing a processor such as a central processing unit (CPU) to execute a predetermined program. The software functional unit is an electronic central unit (ECU) including the processor such as the CPU and electronic circuits such as a read only memory (ROM) storing a program, a random access memory (RAM) temporarily storing data, and a timer. At least a part of the control device 16 may be integrated circuit such as a large scale integration (LSI) circuit.

For example, the control device 16 generates a control signal indicating timings for driving the switching elements in the on (connected) state and the off (disconnected) state of each switching element and generates a gate signal for actually driving the switching elements in the on (connected) state and the off (disconnected) state on the basis of the control signal. For example, the control device 16 optimizes a load resistance value R using impedance conversion such that an optimal operating point changing according to load states of the power storage device 11, the first power converting device 12, the rotary electric machine 13, and the like is followed by controlling switching of the switching elements of the second power converting device 15. There is a unique correspondence between the load resistance value R which is a resistance value on a load side when seen from the power transmitting unit 8 and the power receiving unit 31, and power transmission efficiency between the power transmitting unit 8 and the power receiving unit 31, and optimization of the load resistance value R corresponds to maximization of transmission efficiency. The control device 16 controls following an optimal operating point through optimization of the load resistance value R and maximization of transmission efficiency.

Figure 3:
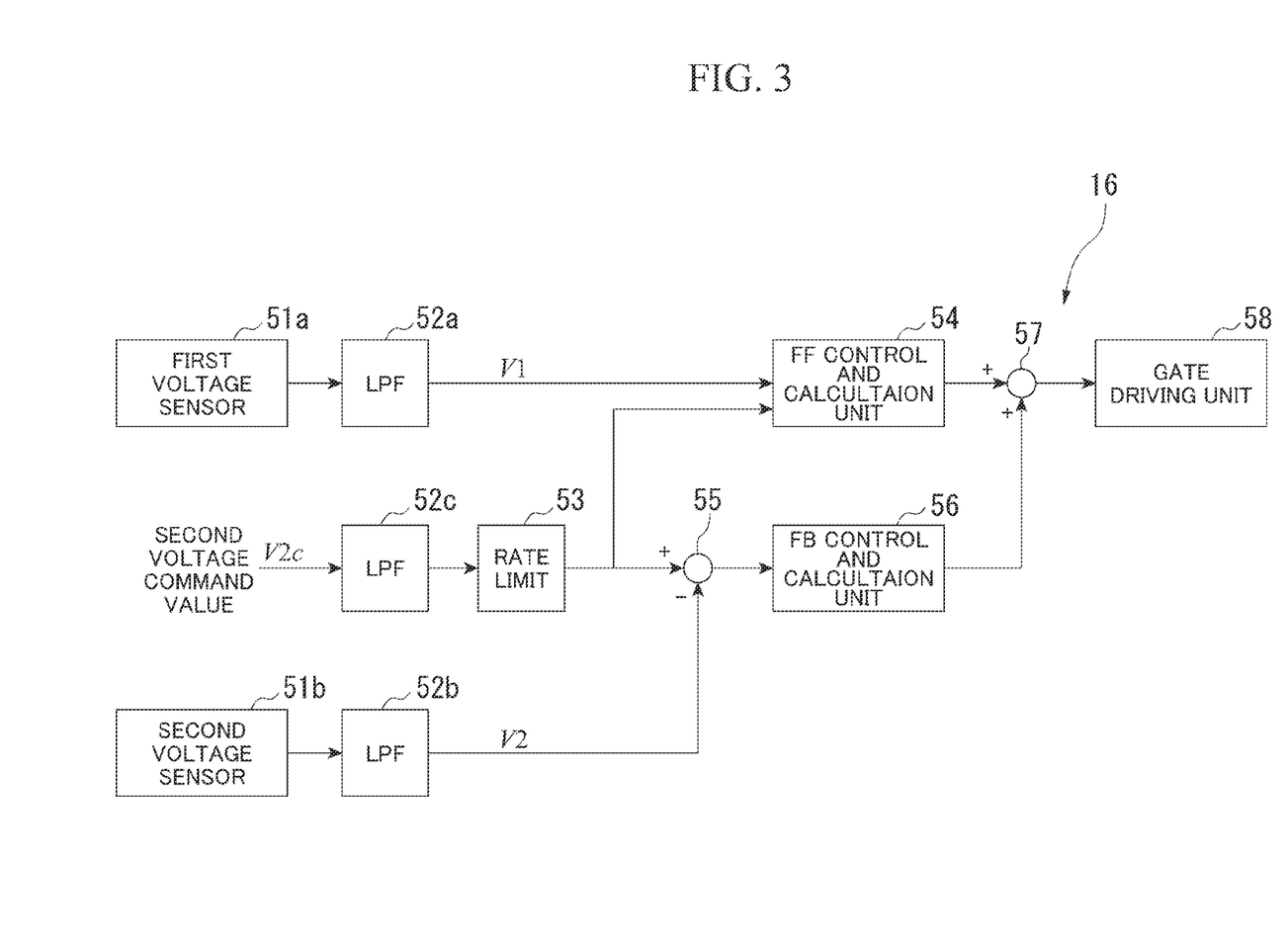
FIG. 3 is a diagram illustrating a part of a configuration of a control device of the power control device according to the embodiment of the present invention.
Figure 4:
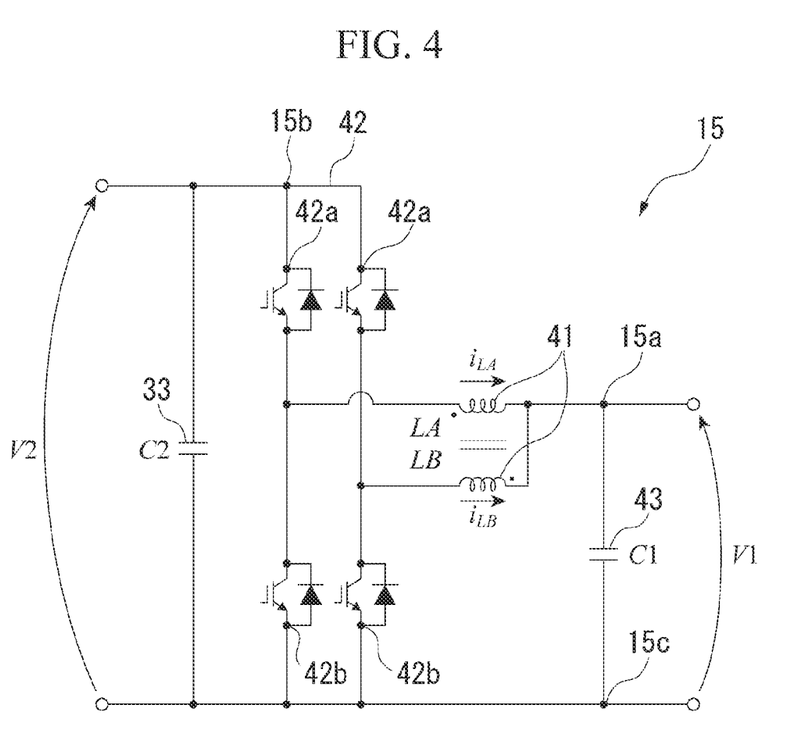
FIG. 4 is a diagram illustrating a configuration of a second power converting device of the power control device according to the embodiment of the present invention.

FIG. 3 is a diagram illustrating a part of the configuration of the control device 16 of the power control device 10 according to the embodiment and illustrating a configuration associated with control of the second power converting device 15. FIG. 4 is a diagram illustrating the configuration of the second power converting device 15 of the power control device 10 according to the embodiment.

As illustrated in FIG. 3, the control device 16 includes, for example, a first voltage sensor 51a, a second voltage sensor 51b, three low-pass filters (LPF) 52a, 52b, and 52c, a rate limit 53, a feedforward (FF) control and operating unit 54, a subtraction unit 55, a feedback (FB) control and operating unit 56, an addition unit 57, and a gate driving unit 58.

As illustrated in FIGS. 3 and 4, the first voltage sensor 51a detects a first voltage V1 which is a voltage input from the secondary side of the second power converting device 15 to the primary side of the first power converting device 12. The first voltage V1 is a secondary-side voltage with respect to a primary-side voltage (a second voltage V2) in voltage conversion in the second power converting device 15. For example, the first voltage sensor 51a detects a voltage (the first voltage V1) between the positive terminal 15a on the secondary side of the second power converting device 15 and the negative terminal 15c and outputs a detection value of the first voltage V1.

The second voltage sensor 51b detects the second voltage V2 which is a voltage output from the power receiving device 14 on the secondary side with respect to the power transmitting device 2 on the primary side in non-contact power transmission. For example, the second voltage sensor 51b detects the voltage (the second voltage V2) between the positive terminal 15b and the negative terminal 15c on the primary side of the second power converting device 15 and outputs a detection value of the second voltage V2.

The first low-pass filter 52a removes a high-frequency component of the detection value of the first voltage V1 output from the first voltage sensor 51a.

The second low-pass filter 52b removes a high-frequency component of the detection value of the second voltage V2 output from the second voltage sensor 51b.

The third low-pass filter 52c removes a high-frequency component of a second voltage command value V2c which is a command value for the second voltage V2.

For example, each of the low-pass filters 52a, 52b, and 52c performs an anti-aliasing process and performs a filtering process such that a resonance frequency area in the power receiving device 14 and the second power converting device 15 is removed.

For example, the rate limit 53 limits a rate of change of the second voltage command value V2c such that torque change in the rotary electric machine 13 due to change of the first voltage V1 is curbed.

The second voltage command value V2c is, for example, a command value for an average value of the second voltage V2 in an equilibrium state (for example, an average value of the second voltage in one period of switching control: a second voltage average value V2av). The control device 16 sets the second voltage V2 at an optimal operating point (a second voltage at an optimal operating point V2op) at which the transmission efficiency is maximized as the second voltage command value V2c.

The second voltage at an optimal operating point V2op is described using a primary-side voltage Vs in the power transmitting device 2, resistances Rt and Rr of the power transmitting unit 8 and the power receiving unit 31, a mutual inductance Lm of the power transmitting unit 8 and the power receiving unit 31, and a resonance angular frequency ω0 which are known and constant as expressed by Expression (1).

$$V2op = \sqrt{\frac{Rr}{Rt}} \frac{\omega 0 Lm}{\sqrt{RtRr + (\omega 0 Lm)^2} + \sqrt{RtRr}} Vs \quad (1)$$

The feedforward (FF) control and operating unit 54 calculates a target duty Dt for causing the second voltage average value V2av in the equilibrium state to conform to the second voltage command value V2c on the basis of the first voltage V1 and the second voltage command value V2c. The target duty Dt is a target value of a ratio of an on time of one of the transistors 42a and 42b forming a pair (for example, the transistor 42a in the high-side arm) in one period of switching control in each pair of the second power converting device 15.

The control device 16 models an interleave DC-DC converter including a pair of reactors 41 and the element module 42 of the second power converting device 15, for example, using a state averaging process as expressed by Expression (2).

$$\begin{pmatrix} LA & -M & 0 \\ -M & LB & 0 \\ 0 & 0 & C2 \end{pmatrix} \frac{dx}{dt} = \begin{pmatrix} -rA & 0 & -Dt \\ 0 & -rB & -Dt \\ Dt & Dt & -\frac{1}{R} \end{pmatrix} x + \begin{pmatrix} 1 \\ 1 \\ 0 \end{pmatrix} V1 \quad (2)$$

$$x = \begin{pmatrix} i_{LA} \\ i_{LB} \\ V2av \end{pmatrix}, \text{ (for } Dt \le 0.5\text{)}$$

In Expression (2), a variable (an average value in one period of switching control) x is described using currents (an average value in one period of switching control) $i_{LA}$ and $i_{LB}$ in the phases of the two-phase element modules 42 and the second voltage average value V2av.

Expression (2) is described using a time differential (dx/dt) of the variable x, the variable x, the first voltage V1, self-inductances LA and LB and a mutual inductance M of the pair of reactors 41, a capacitance C2 of the capacitor 33, resistances rA and rB of the pair of reactors 41, the target duty Dt, and the load resistance value R.

In Expression (2), the second voltage average value V2av in a steady state (dx/dt) in which the time differential (dx/dt) of the variable x is zero is described using the target duty Dt and the first voltage V1 as expressed by Expression (3). In Expression (3), it is assumed that a parallel combined resistance value (rA/rB) is sufficiently smaller than the load resistance value R.

$$V2av = \frac{Dt}{\frac{rA//rB}{R} + Dt^2} V1 \approx \frac{1}{Dt} V1 \quad (3)$$

Based on Expression (3), the feedforward (FF) control and operating unit 54 calculates the target duty Dt for causing the second voltage average value V2av in the equilibrium state to conform to the second voltage command value V2c using the first voltage V1 and the second voltage command value V2c as expressed by Expression (4).

$$Dt = \frac{V1}{V2c} \text{ (for } 0 \le Dt < 1\text{)} \quad (4)$$

The subtraction unit 55 outputs a second voltage difference ΔV2 which is obtained by subtracting the second voltage V2 from the second voltage command value V2c.

The feedback (FB) control and operating unit 56 controls a near-equilibrium-point model P(s) of the interleave DC-DC converter including the pair of reactors 41 and the element module 42 of the second power converting device 15. The near-equilibrium-point model P(s) is described using the second voltage difference ΔV2, a duty difference ΔD, a current (an average value in one period of switching control) $i_L$ and a resistance r of the pair of reactors 41, a self-inductance L and a mutual inductance M of the pair of reactors 41, the target duty Dt, the second voltage average value V2av, the capacitance C2 of the capacitor 33, the load resistance value R, and a complex number s as expressed by Expression (5).

$$\frac{\Delta V2(s)}{\Delta D(s)} = \frac{\begin{array}{c} -2i_L(L^2 - M^2)s^2 + \\ 2(DtV2av(L+M) + \\ 2rLi_L)s + 2r(DtV2av - ri_L) \end{array}}{C2(L^2 - M^2)s^3 + \left(2rLC2 + \frac{L^2 - M^2}{R}\right)s^2 + \left(r^2C2 + \frac{2rL}{R} + 2(L+M)Dt^2\right)s + \left(2rDt^2 + \frac{r^2}{R}\right)} \equiv P(s) \quad (5)$$

The feedback (FB) control and operating unit 56 outputs the duty difference ΔD which is calculated, for example, such that the second voltage difference ΔV2 is zero through so-called PID compensation using gains of proportional, integral, and differential operations.

The addition unit 57 outputs a duty command value which is obtained by adding the target duty Dt output from the feedforward (FF) control and operating unit 54 and the duty difference ΔD output from the feedback (FB) control and operating unit 56.

The gate driving unit 58 outputs a gate signal for driving the switching elements of the element module 42 in the on (connected) state and the off (disconnected) state of each switching element according to the duty command value.

As described above, with the power control device 10 according to the embodiment, it is possible to efficiently perform power conversion using the pair of reactors 41 that are magnetically coupled and the element module 42 while maintaining the optimal operating point and to enhance power transmission efficiency in a non-contact manner. Since the load resistance value R when seen from the power transmitting device 2 and the power receiving device 14 seems to be constant, for example, regardless of output change while a vehicle is traveling or the like, it is possible to curb occurrence of a problem such as a decrease in efficiency or a decrease in output. Accordingly, it is possible to maximize the power transmission efficiency regardless of a state of the rotary electric machine 13 corresponding to a traveling state of the vehicle, an auxiliary-machine load state, or a state such as a residual capacity of the power storage device 11.

It is possible to control the load resistance value R on the basis of the second voltage V2 and to maximize the power transmission efficiency by optimizing the load resistance value R based on the second voltage at an optimal operating point V2op.

It is possible to enhance the power transmission efficiency in a non-contact manner with high-efficiency power conversion by modeling the pair of reactors 41 that are magnetically coupled and the element module 42.

MODIFIED EXAMPLES

Modified examples of the embodiment will be described below.

In the aforementioned embodiment, the second power converting device 15 includes two-phase element modules 42 and a pair of reactors 41, but the present invention is not limited thereto. The second power converting device 15 may include at least two-phase element modules and at least a pair of reactors 41.

While an embodiment has been described above, these embodiments are provided as examples and are not intended to limit the scope of the present invention. These embodiments can be realized in various other forms, and various omissions, substitutions, and modifications can be added thereto without departing from the gist of the present invention. These embodiments and modifications thereof are included in the scope or gist of the present invention and are also included in the inventions described in the appended claims and equivalent scopes thereof.

What is claimed is:

1. A power control device comprising:
   a power receiving device configured to receive electric power transmitted from a power transmitting device in a non-contact manner and output DC electric power;
   a power converting device configured to output arbitrary DC electric power by converting the DC electric power output from the power receiving device; and
   a control device configured to control the power receiving device and the power converting device,
   wherein the power converting device includes
      an element module including at least two switching elements, and
      at least a pair of reactors that are magnetically coupled, and
   wherein the control device controls a switching operation of the element module according to a duty ratio based on a voltage at an optimal operating point of the DC electric power input from the power receiving device to the power converting device and a voltage of the DC electric power output from the power converting device,
   wherein the control device sets the voltage at an optimal operating point on the basis of an output voltage of the power transmitting device, resistance values of resistances of the power transmitting device and the power receiving device, a mutual inductance of coils of the power transmitting device and the power receiving device, and a resonance angular frequency.

2. The power control device according to claim 1, wherein the control device uses a voltage of the DC electric power input to the power converting device in a steady state which is obtained by modeling the element module and the reactors as the voltage at an optimal operating point.

* * * * *